(12) United States Patent
Xiong et al.

(10) Patent No.: US 10,718,413 B2
(45) Date of Patent: Jul. 21, 2020

(54) ASSEMBLY HAVING JOINT-CONNECTED MEMBERS AND ROBOT INCLUDING THE SAME

(71) Applicant: UBTECH Robotics Corp, Shenzhen (CN)

(72) Inventors: Youjun Xiong, Shenzhen (CN); Youpeng Li, Shenzhen (CN); Hongyu Ding, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 328 days.

(21) Appl. No.: 15/913,934

(22) Filed: Mar. 7, 2018

(65) Prior Publication Data

US 2019/0203817 A1 Jul. 4, 2019

(30) Foreign Application Priority Data

Dec. 29, 2017 (CN) .......................... 2017 1 1478649

(51) Int. Cl.
*F16H 37/04* (2006.01)
*F16H 7/02* (2006.01)
*F16H 49/00* (2006.01)
*B25J 9/10* (2006.01)

(52) U.S. Cl.
CPC ............ *F16H 37/041* (2013.01); *B25J 9/104* (2013.01); *B25J 9/1025* (2013.01); *F16H 7/023* (2013.01); *F16H 49/001* (2013.01); *Y10S 901/15* (2013.01); *Y10S 901/20* (2013.01); *Y10S 901/23* (2013.01); *Y10S 901/25* (2013.01)

(58) Field of Classification Search
CPC ................................ B25J 9/1025; B25J 9/104
See application file for complete search history.

(56) References Cited

U.S. PATENT DOCUMENTS

| 4,062,601 | A | * | 12/1977 | Pardo ......................... | B25J 9/08 74/640 |
| 4,594,049 | A | * | 6/1986 | Terauchi ................... | B25J 9/042 414/730 |
| 4,620,830 | A | * | 11/1986 | Tsuchihasi ............... | B25J 9/046 414/735 |
| 4,624,621 | A | * | 11/1986 | Murakanni ................ | B25J 9/06 414/735 |
| 2011/0056321 | A1 | * | 3/2011 | Sim ......................... | B25J 9/1025 74/490.04 |
| 2018/0281177 | A1 | * | 10/2018 | Kusumoto ............. | B25J 9/1025 |
| 2019/0126466 | A1 | * | 5/2019 | Owa ......................... | B25J 9/126 |

* cited by examiner

Primary Examiner — Terence Boes

(57) ABSTRACT

An assembly of a robot includes a first member, a second member rotatably connected to the first member to construct a robot joint structure, a driving assembly arranged within the first member, a speed reducer assembly to rotatably connect the first member to the second member, and a belt drive assembly connected to the driving assembly and the speed reducer assembly. The belt drive assembly is used to transmit rotary motion from the driving assembly to the speed reducer assembly, thereby rotating the first member with respect to the second member.

20 Claims, 6 Drawing Sheets

ASSEMBLY HAVING JOINT-CONNECTED MEMBERS AND ROBOT INCLUDING THE SAME

CROSS REFERENCE TO RELATED APPLICATIONS

This application claims priority to Chinese Patent Application No. 201711478649.4, filed Dec. 29, 2017, which is hereby incorporated by reference herein as if set forth in its entirety.

BACKGROUND

1. Technical Field

The present disclosure generally relates to robots, and particularly to an assembly including joint-connected members and a robot including the assembly.

2. Description of Related Art

A servo is a key component of some robots. The servo typically includes a housing, a motor, a speed reducer, an input shaft, and a sensor that are arranged in the housing. Servos are applied in many robot joints. Since the servo housing accommodates components such as the motor, the output shaft, etc., the size of the joints is large. For large humanoid robots, the problem is more serious due to the large output torque of the servos. In addition, because of the large output torque of the servos, metal gears are usually used in the servos, and will generate noise during operation.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
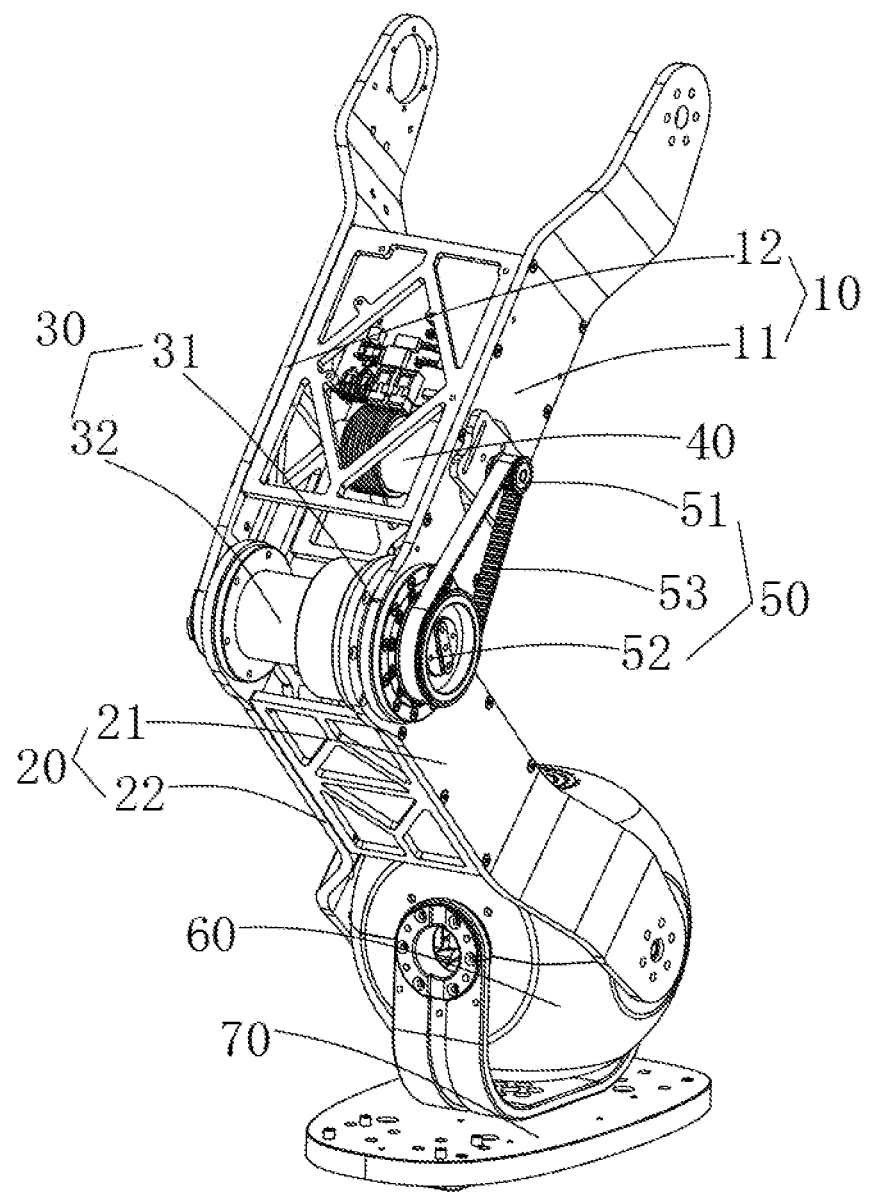
FIG. 1 is an isometric view of an assembly of a robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

FIGS. 1-6 show an assembly for a robot according to one embodiment. In the embodiment, the assembly is a limb of the robot and includes a skeleton assembly, a speed reducer assembly 30 arranged within the skeleton assembly, and a driving assembly 40. The driving assembly 40 is disposed separately from the speed reducer assembly 30. The skeleton assembly includes a first member 10 and a second member 20, and the driving assembly 40 is mounted in the first member 10. The speed reducer assembly 30 is used to rotatably connect the first member 10 to the second member 20 to construct a robot joint structure, and includes a speed reducer and a connecting member 32 connected to the speed reducer. In the embodiment, the speed reducer is a harmonic drive 31. With such configuration that the driving assembly 40 is arranged separately from the speed reducer assembly 30, the compactness of the assembly can thus be achieved. The driving assembly 40 and one end of the speed reducer assembly 30 are connected by a transmission assembly 50. A detection unit 80 for detecting the rotation angle of the first member 10 with respect to the second member 20 is also connected to an end surface of the other opposite end of the speed reducer assembly 30. The configuration that the detection unit 80 is disposed at one end of the speed reducer assembly 30 and disposed separately from the driving assembly 40 can reduce interference of a motor of the driving assembly 40 to the detection circuit and further improve the detection accuracy of the rotation angle of the first member 10 with respect to the second member 20.

Referring again to FIGS. 1-2, in one embodiment, the transmission assembly 50 is a belt drive assembly and includes a first drive pulley 51 located at one side of the first member 10, a second driven pulley 52 connected to an input shaft of the harmonic drive 31, and a transmission belt 53 wrapped around the drive pulley 51 and the driven pulley 52. The diameter of the drive pulley 51 is smaller than the diameter of the driven pulley 52 so as to effectively increase the speed reduction ratio and make the overall mass distribution of the robot more uniform. In addition, by using the transmission belt 53 for motion transmission, noise during operation can be effectively reduced.

In one embodiment, the drive pulley 51 includes gear teeth in a circumferential surface thereof. The driving assembly 40 includes a motor and a control circuit board coupled to the motor. One end of the output shaft of the motor extends out of the first member 10, and the drive pulley 51 is arranged around the output shall of the motor. The driven pulley 52 includes gear teeth in a circumferential surface thereof, and is arranged around the input shaft of the harmonic drive 31. The transmission belt 53 is a toothed belt. When the motor drives the drive pulley to rotate, the driven pulley is driven to rotate synchronously by the transmission belt 53. Since the diameter of the driven pulley is greater than the diameter of the drive pulley, the belt 53 can achieve a first stage speed reduction of the output of the driving assembly. Compared with conventional gear transmission, it can effectively reduce the noise generated during operation by using the transmission bell 53. When the driven pulley rotates, an input shaft 311 of the harmonic drive 31 is driven to rotate, and the internal components of the harmonic drive 31 work with one another to achieve a second stage speed reduction, which can effectively increase the speed reduction ratio.

Figure 4:
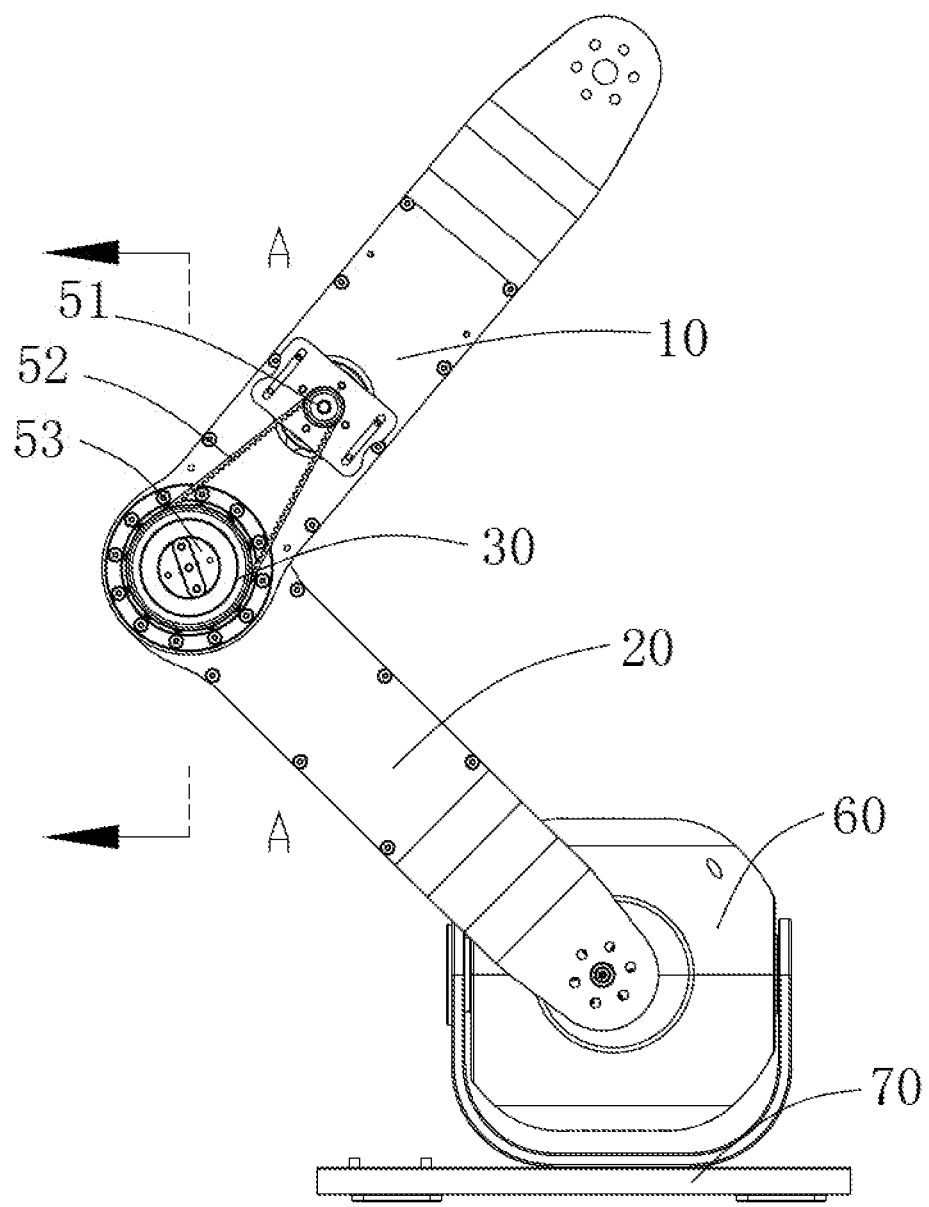
FIG. 4 is a planar side view of the assembly of FIG. 1.
Figure 5:
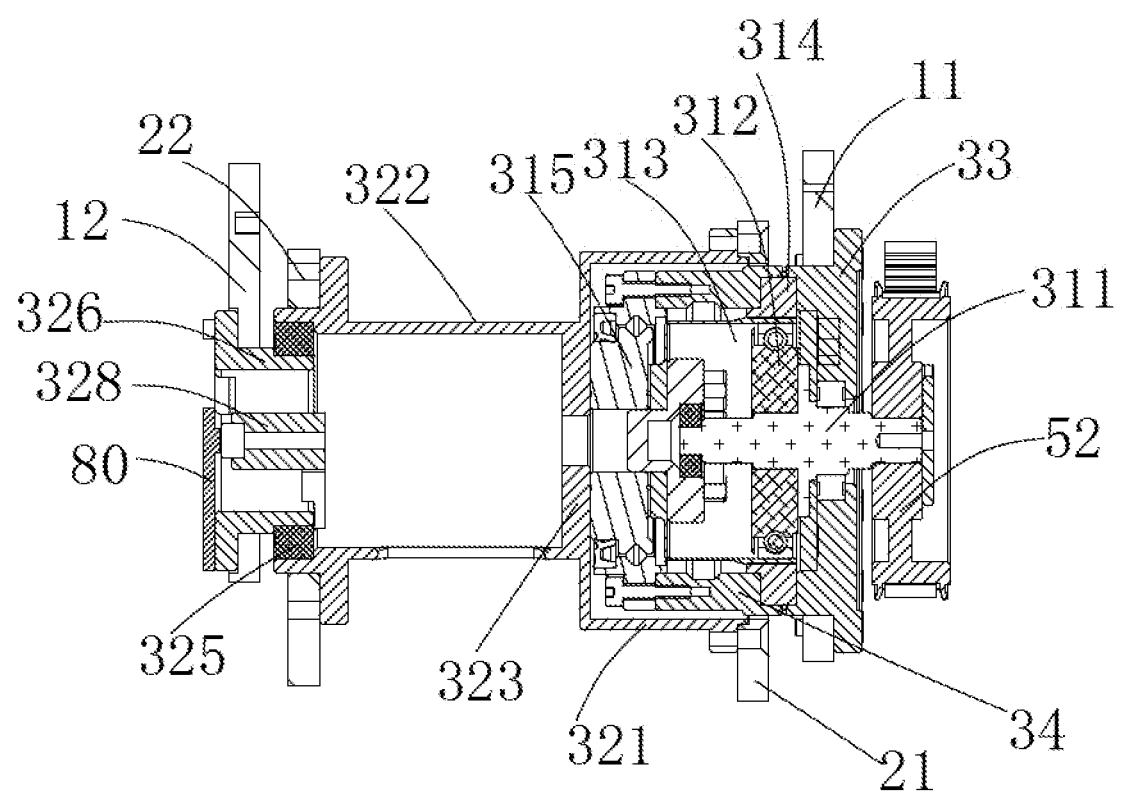
FIG. 5 is a sectional view of the assembly of FIG. 4, taken along line A-A.

Specifically, as shown in FIGS. 4 and 5, the speed reducer is a harmonic drive 31, which can effectively reduce the size and mass of the assembly. The connecting member 32 is connected to the output component of the harmonic drive 31.

Referring again to FIG. 5, in one embodiment, the harmonic drive 31 includes the input shaft 311 where the transmission assembly 50 is connected, a wave generator 312 arranged around the input shaft 311, a flex spline 313 arranged around the wave generator 312, a circular spline 314 arranged around the flex spline 313, and an output bearing 315 connected to the flex spline 313. In the embodiment, the output bearing 315 is fixed to the flex spline 313 through a flexspline sheet having a bearing mounting portion. The connecting member 32 is connected to the output bearing 315. One end of the input shaft 311 is connected to the driven pulley 52, and the other opposite end is received in the inner ring of the bearing.

In the embodiment, the transmission ratio is controlled by the difference in the number of teeth between the flex spline 313 and the circular spline 314, so that the speed reduction ratio can be effectively increased. The output bearing 315 is a cross roller bearing, which can reduce the size of the output portion and provides a more stable output, and can effectively reduce the influence of external interference on the output of the reducer.

In the embodiment, the circular spline 314 is fixed and the flex spline 313 rotates with respect to the circular spline 314.

Referring again to FIG. 5, in one embodiment, the harmonic drive 31 further includes an end cap 33 connected to the first member 10, and an outer casing 34 arranged around the circular spline 314. The wave generator 312, the flex spline 313, the circular spline 314 and the flexspline sheet are all disposed in a space defined by the end cap 33 and the outer casing 34. The input shaft 311 passes through the end cap 33 and is connected to the driven pulley 52. A connecting bearing 331 is arranged at inner side of the end cap 33 and is arranged around the input shaft 311. Two opposite ends of the input shaft 311 are supported by the bearings, allowing the input shaft 311 to rotate smoothly.

In one embodiment, the circular spline 314 is fixedly fit within a groove formed by the end cap 33 and the outer casing 34. During assembling, the end cap 33 is first fixed to the first member, and then fixed to the circular spline and the outer easing 34 by screws. The wave generator 312 is then arranged around on the input shaft 311. The motor can then transmit the driving force to the driven pulley 52 through the transmission belt 53, which then drives the input shaft 311 to rotate, thus achieving the first stage speed reduction. The input shaft 311 then drives the wave generator 312 and the flex spline 313 to rotate, and the connecting member 32 is driven to rotate by the output bearing 315, which drives the second member 20 to rotate with respect to the first member 10.

Figure 2:
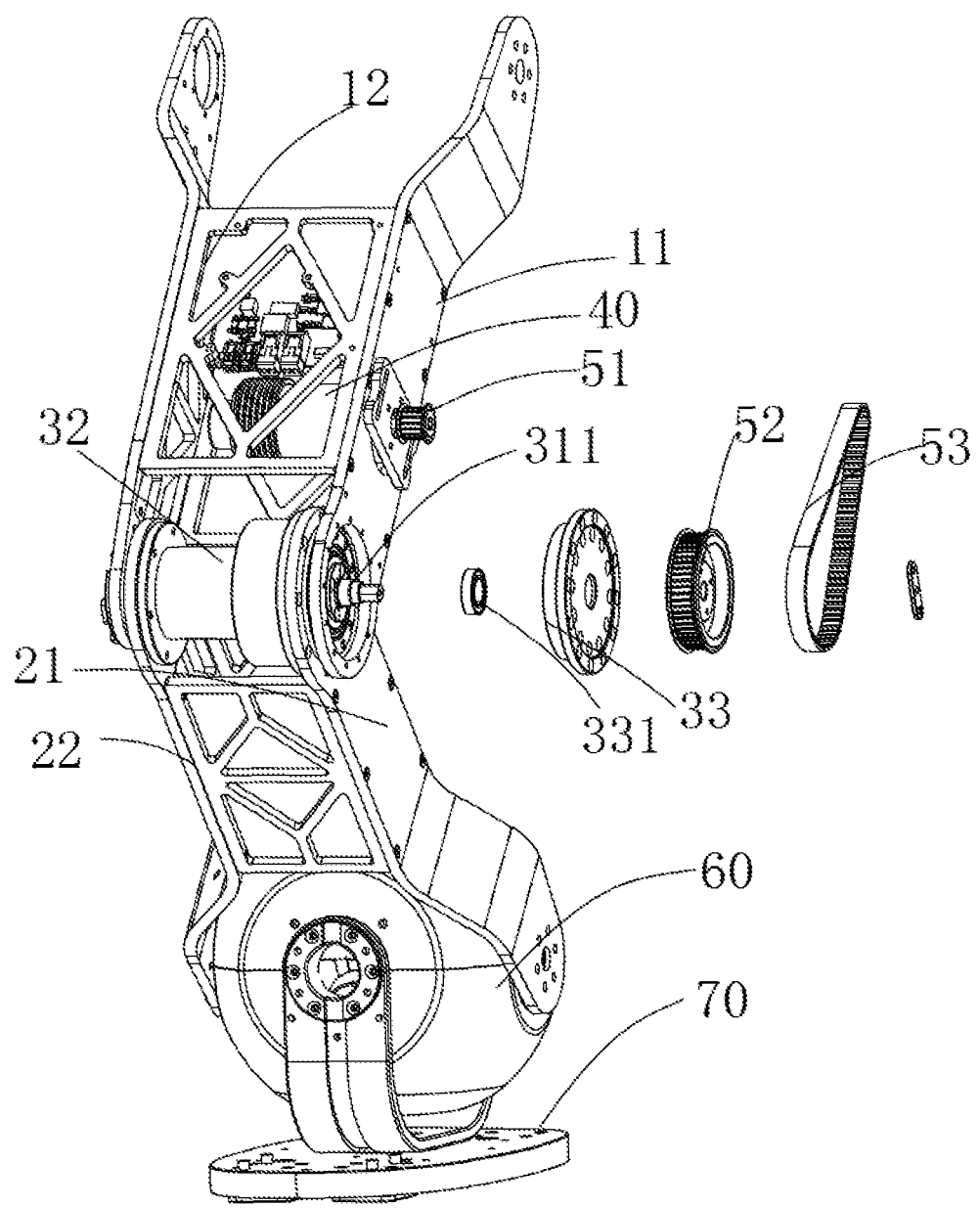
FIG. 2 is an isometric partly exploded view of the assembly of FIG. 1, viewed from a first perspective.
Figure 3:
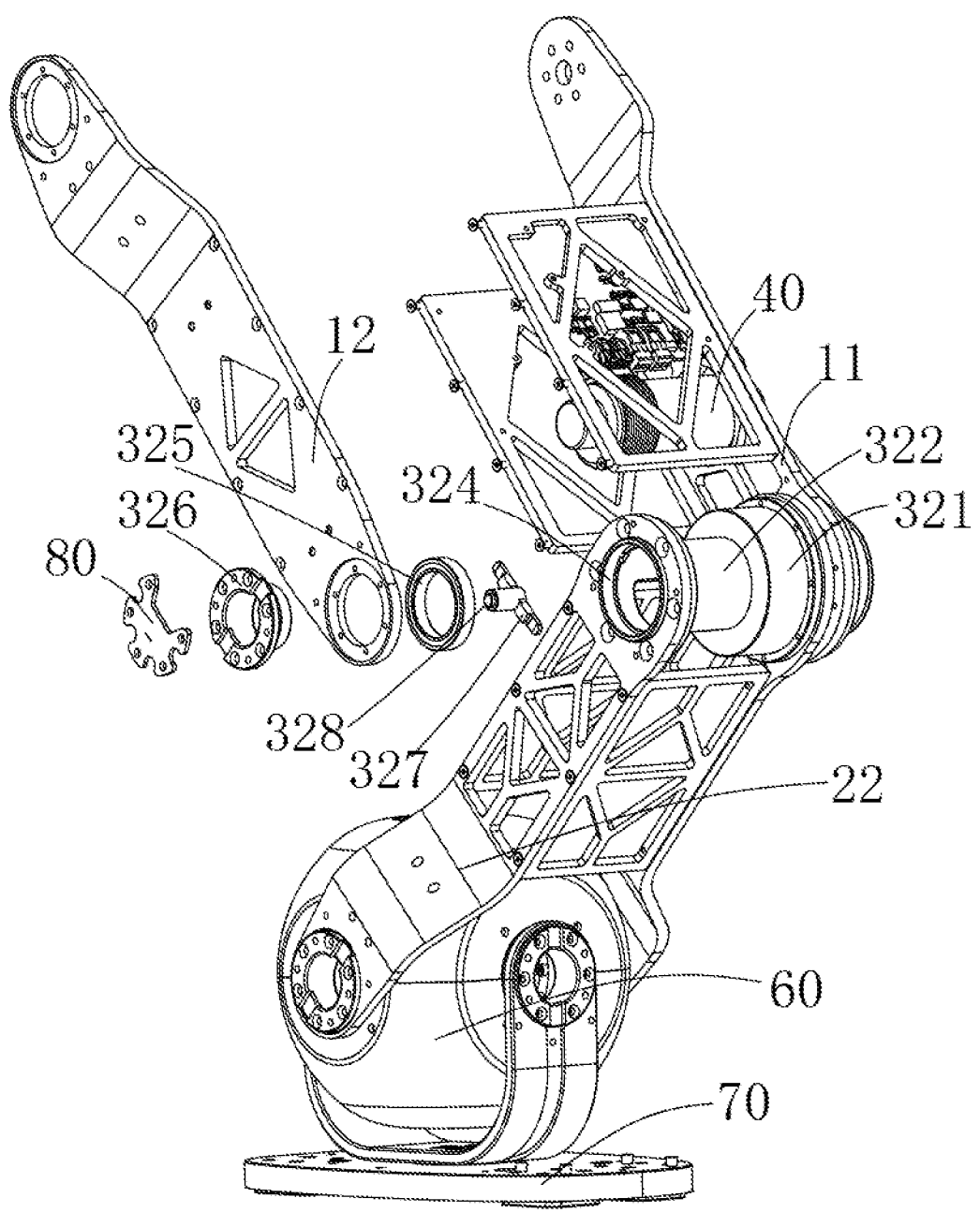
FIG. 3 is an isometric partly exploded view of the assembly of FIG. 1, viewed from a second perspective.
Figure 6:
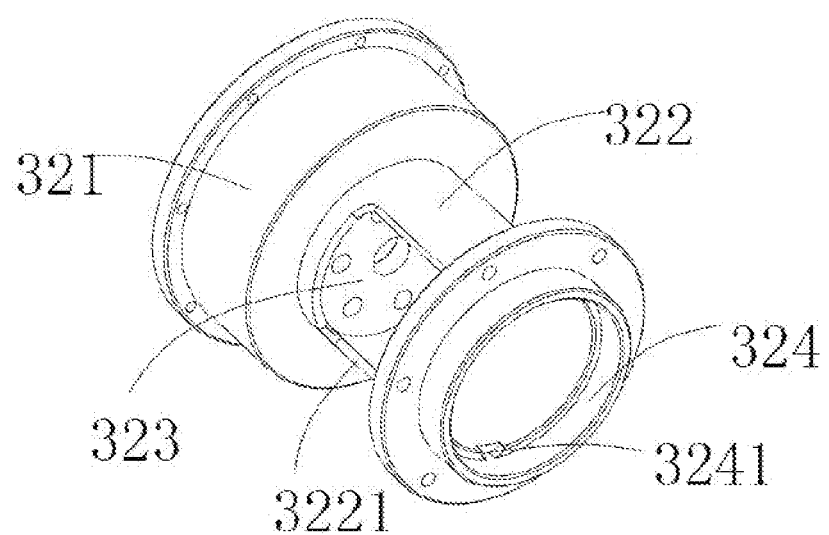
FIG. 6 is an isomeric view of a connecting member of the assembly of FIG. 1.

Referring also to FIGS. 2, 5 and 6, in one embodiment, the connecting member 32 includes a main sleeve 321 that accommodates the harmonic drive 31 therein and a connecting sleeve 322 that extends from one end of the main sleeve 321 away from the harmonic drive 31. A wall 323 is formed at one end of the connecting sleeve 322, and the output bearing 315 is fixed to the wall 323. When the input shaft 311 rotates, the output bearing 315 is driven to rotate and then drives the connecting sleeve 322 to rotate. The connecting sleeve 322 define a cut-out that allows cables to pass therethrough, and includes a magnet support 327 fixed to the inner surface thereof. The detection unit 80 includes a magnetically coded sensor mounted on a control circuit hoard 81 and a magnet 328, When the connecting sleeve 322 rotates, the magnetic coded sensor cooperates with the magnet 328 to effectively detect the rotation angle of the first member with respect to the second member. Because the driving assembly 40 and the detection unit are separately disposed in different locations that are away from each other, the influence between the two can be effectively reduced, and the detection accuracy of rotation angle can be effectively improved.

In one embodiment, the connecting sleeve 322 includes a bearing receiving space 324 at the opening end thereof for receiving the mounting bearing 325 therein. An opening 3241 is defined in a bottom of the bearing receiving space 324 for holding the magnet support 327 in position. A flange 326 is attached to the mounting bearing 325, and the control circuit board 81 is mounted on the outer side of the flange 326, which allows the control circuit board 81 to be less affected by the driving assembly 40.

Referring again to FIGS. 1-3, in one embodiment, the first member 10 includes a first plate 11 and a second plate 12 that are disposed opposite to each other. The second member 20 includes a third plate 21 and a fourth plate 22 that are disposed opposite to each other. The driving assembly 40 is fixed between the first plate 11 and the second plate 12. In other embodiments, the driving assembly 40 may be fixed between the third plate 21 and the fourth plate 22.

In one embodiment, the first plate 11 is fixed to the end cap 33. The second plate 12 is fixed to the flange 326. The third plate 21 is fixed to an end of the main sleeve 321. The fourth plate 22 is fixed to the connecting sleeve 322. With such configuration, when the driving assembly drives the drive pulley 51 to rotate, the driven pulley 52 is driven to rotate synchronously, and further drives the input shaft 311 to rotate, which achieves a first stage speed reduction. Then, the input shaft 311 rotates and drives the wave generator 312 and the flex spline 313 to rotate. The flex spline 313 then drives the output bearing 315 fixed thereto to rotate. The output bearing 315 then drives the connecting sleeve 322 to rotate, which drives the third plate 21 and the fourth plate 22 to rotate with respect to the first member 10.

Referring again to FIGS. 1-3, in one embodiment, a rotatable ankle joint assembly 60 and a foot 70 for supporting the whole structure are arranged below the second member 20. The ankle joint assembly 60 is rotatably connected to the lower end of the second member 20 and the foot 70 at different locations. In the embodiment, the assembly is a leg of a robot. Specifically, the first member serves as a robot thigh and the second member serves as a robot lower leg. However, the present disclosure is not limited thereto. In other embodiments, the first member may serve as an upper arm and the second member may serve as a lower arm.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:
1. An assembly of a robot, comprising:
a first member;

a second member rotatably connected to the first member to construct a robot joint structure;

a driving assembly arranged within the first member;

a speed reducer assembly configured to rotatably connect the first member to the second member; and a belt drive assembly connected to the driving assembly and the speed reducer assembly, the belt drive assembly being configured to transmit rotary motion from the driving assembly to the speed reducer assembly, thereby rotating the first member with respect to the second member;

wherein the speed reducer assembly comprises a speed reducer comprising an input shaft and an output component, and a connecting member connected to the speed reducer, a driven pulley is mounted on the input shaft, and the output component is connected to the second member through the connecting member;

wherein the speed reducer is a harmonic drive and comprises an end cap, the input shaft, a wave generator arranged around the input shaft, a flex spline arranged around the wave generator, a circular spline arranged around the flex spline, an outer casing arranged around the circular spline, and an output bearing fixed to the flex spline, one end of the input shaft extends outside the end cap, and the end cap is fixed to the first member;

wherein the driven pulley is fixed to the end of the input shaft extending outside the end cap, a rotating bearing is mounted at an inner side of the end cap, and the rotating bearing is arranged around the input shaft; and wherein the connecting member comprises a main sleeve that accommodates the speed reducer therein and a connecting sleeve that extends from one end of the main sleeve away from the speed reducer, a wall is formed at one end of the connecting sleeve, the output bearing is fixed to the wall.

2. The assembly according to claim 1, wherein the belt drive assembly comprises a driving pulley comprising external gear teeth in a circumferential surface thereof, a driven pulley comprising external gear teeth in a circumferential surface thereof, and a transmission belt wrapped about the driving pulley and the driven pulley.

3. The assembly according to claim 2, wherein the driving pulley has a diameter smaller than a diameter of the driven pulley.

4. The assembly according to claim 1, wherein the first member comprises a first plate and a second plate that are disposed opposite to each other, the second member comprises a third plate and a fourth plate that are disposed opposite to each other, the first plate is fixed to the end cap, the second plate is fixed to the connecting sleeve through a flange, the third plate is fixed to the main sleeve, and the fourth plate is fixed to the connecting sleeve.

5. The assembly according to claim 4, wherein the connecting sleeve comprises a mounting bearing therein at one end thereof, and the flange is connected to the mounting bearing.

6. The assembly according to claim 5, further comprising a detection unit for detecting a rotation angle of the first member with respect to the second member, wherein the detection unit comprises a magnetically coded sensor mounted on an outer side of the flange and a magnet mounted in the connecting sleeve and disposed opposite to the magnetically coded sensor.

7. A robot comprising an assembly, the assembly comprising:

a first member;

a second member rotatably connected to the first member to construct a robot joint structure;

a driving assembly arranged within the first member;

a speed reducer assembly configured to rotatably connect the first member to the second member; and a belt drive assembly connected to the driving assembly and the speed reducer assembly, the belt drive assembly being configured to transmit rotary motion from the driving assembly to the speed reducer assembly, thereby rotating the first member with respect to the second member;

wherein the speed reducer assembly comprises a speed reducer comprising an input shaft and an output component, and a connecting member connected to the speed reducer, the driven pulley is mounted on the input shaft, and the output component is connected to the second member through the connecting member;

wherein the speed reducer is a harmonic drive and comprises an end cap, the input shaft, a wave generator arranged around the input shaft, a flex spline arranged around the wave generator, a circular spline arranged around the flex spline, an outer casing arranged around the circular spline, and an output bearing fixed to the flex spline, one end of the input shaft extends outside the end cap, and the end cap is fixed to the first member;

wherein the driven pulley is fixed to the end of the input shaft extending outside the end cap, a rotating bearing is mounted at an inner side of the end cap, and the rotating bearing is arranged around the input shaft; and wherein the connecting member comprises a main sleeve that accommodates the speed reducer therein and a connecting sleeve that extends from one end of the main sleeve away from the speed reducer, a wall is formed at one end of the connecting sleeve, the output bearing is fixed to the wall.

8. An assembly of a robot, comprising:

a first member;

a second member connected to the first member to construct a robot joint structure and rotatable about a first rotational axis relative to the first member;

a speed reducer assembly configured to rotatably connect the first member to the second member, comprising a first end and a second end opposite to each other;

a driving assembly arranged within the first member and arranged separately from the speed reducer assembly;

a belt drive assembly connected to the driving assembly and the first end of the speed reducer assembly, the belt drive assembly being configured to transmit rotary motion from the driving assembly to the speed reducer assembly, thereby rotating the first member with respect to the second member; and a detection unit for detecting a rotation angle of the first member with respect to the second member, the detection unit being disposed at the second end of the speed reducer assembly and disposed separately from the driving assembly.

9. The assembly according to claim 8, wherein the speed reducer assembly comprises a speed reducer and a connecting member, the connecting member connects the speed reducer to the second member and has a cylindrical shape, and the cylindrical shape comprises an axially central axis aligned with the first rotational axis and defines an accommodating cavity within which the speed reducer is received.

10. The assembly according to claim 9, wherein the driving assembly comprises a motor and a control circuit board coupled to the motor, the motor comprises an output shaft extending out of the first member to connect with the belt drive assembly, and the output shaft is rotatable about a second rotational axis that extends in an external of the speed reducer assembly.

11. The assembly according to claim 10, wherein the speed reducer comprises an input shaft, the belt drive assembly is located outside the first member and comprises a driving pulley, a driven pulley and a transmission belt, the driving pulley is mounted on the output shaft of the motor, the driven pulley is mounted on the input shaft of the speed reducer, and the transmission belt is wrapped about the driving pulley and the driven pulley.

12. The assembly according to claim 8, wherein the belt drive assembly comprises a driving pulley comprising external gear teeth in a circumferential surface thereof, a driven pulley comprising external gear teeth in a circumferential surface thereof, and a transmission belt wrapped about the driving pulley and the driven pulley.

13. The assembly according to claim 12, wherein the driving pulley has a diameter smaller than a diameter of the driven pulley.

14. The assembly according to claim 12, wherein the speed reducer assembly comprises a speed reducer comprising an input shaft and an output component, and a connecting member connected to the speed reducer, a driven pulley is mounted on the input shaft, and the output component is connected to the second member through the connecting member.

15. The assembly according to claim 14, wherein the speed reducer is a harmonic drive and comprises an end cap, the input shaft, a wave generator arranged around the input shaft, a flex spline arranged around the wave generator, a circular spline arranged around the flex spline, an outer casing arranged around the circular spline, and an output bearing fixed to the flex spline, one end of the input shaft extends outside the end cap, and the end cap is fixed to the first member.

16. The assembly according to claim 15, wherein the driven pulley is fixed to the end of the input shaft extending outside the end cap, a rotating bearing is mounted at an inner side of the end cap, and the rotating bearing is arranged around the input shaft.

17. The assembly according to claim 16, wherein the connecting member comprises a main sleeve that accommodates the speed reducer therein and a connecting sleeve that extends from one end of the main sleeve away from the speed reducer, a wall is formed at one end of the connecting sleeve, the output bearing is fixed to the wall.

18. The assembly according to claim 17, wherein the first member comprises a first plate and a second plate that are disposed opposite to each other, the second member comprises a third plate and a fourth plate that are disposed opposite to each other, the first plate is fixed to the end cap, the second plate is fixed to the connecting sleeve through a flange, the third plate is fixed to the main sleeve, and the fourth plate is fixed to the connecting sleeve.

19. The assembly according to claim 18, wherein the connecting sleeve comprises a mounting bearing therein at one end thereof, and the flange is connected to the mounting bearing.

20. The assembly according to claim 19, wherein the detection unit comprises a magnetically coded sensor mounted on an outer side of the flange and a magnet mounted in the connecting sleeve and disposed opposite to the magnetically coded sensor.

* * * * *